No. 684,604. Patented Oct. 15, 1901.
A. S. DIXON.
CONDUIT PIPE.
(Application filed Mar. 29, 1901.)
(No Model.)
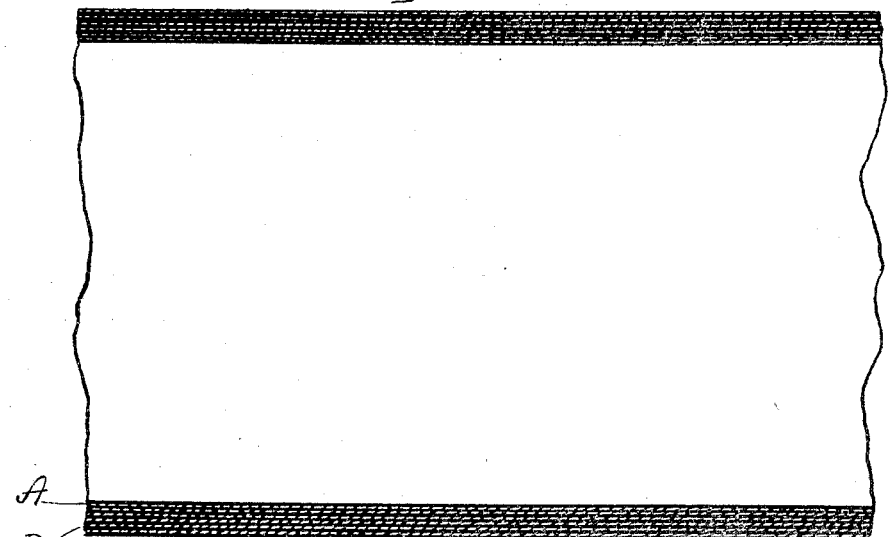
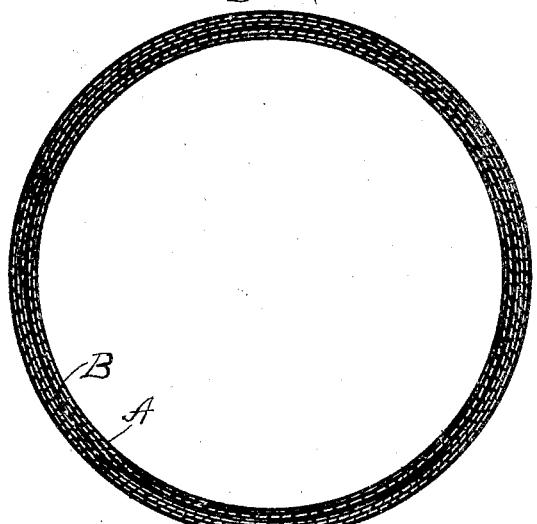
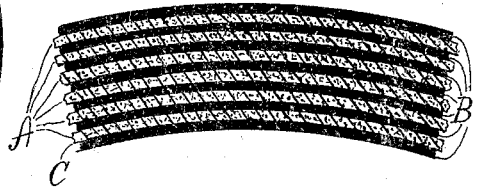
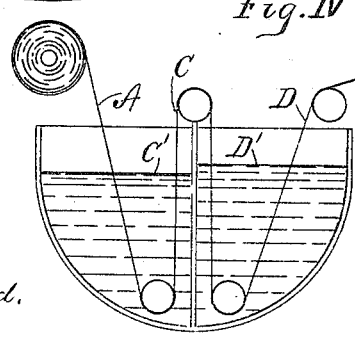
Witnesses
C. C. Holly
J. W. Townsend.
Inventor
Albert Stanley Dixon
by
Townsend Bros
his Attys.

UNITED STATES PATENT OFFICE.

ALBERT S. DIXON, OF LOS ANGELES, CALIFORNIA, ASSIGNOR TO ASPHALT PAPER PIPE COMPANY, OF LOS ANGELES, CALIFORNIA, A CORPORATION OF CALIFORNIA.

CONDUIT-PIPE.

SPECIFICATION forming part of Letters Patent No. 684,604, dated October 15, 1901.

Application filed March 29, 1901. Serial No. 53,508. (No model.)

*To all whom it may concern:*

Be it known that I, ALBERT STANLEY DIXON, residing at Los Angeles, in the county of Los Angeles and State of California, have invented a new and useful Conduit-Pipe, of which the following is a specification.

The object of this invention is to provide a cheap, light, strong conduit-pipe which can be used for conducting water and which is also suitable for conduits for electrical wires and for other purposes.

In carrying out my invention I have produced a new article of manufacture which differs from all former pipe constructions in that my pipe is made of an integral convolute sheet of porous fabric and an interposed convolute body substantially composed of stiff asphaltum, the convolute sheet being permeated with a filling of asphaltum or maltha and the convolute body of stiff asphaltum, contacting throughout with both sides of said sheet, so that I have combined an integral yielding flexible convolute with a rigid and hard convolute, so that the whole mass becomes practically integral, although composed of alternate layers in convolutions of material having great tensile strength and proof against cracking and other layers of great rigidity, the bond between the two being absolutely perfect for all practical purposes and preventing any moving of the layers upon each other in case of any crushing force being brought to bear upon the pipe.

By this invention I have combined extreme strength, rigidity, and lightness, and produced a pipe of this character which is impermeable to water.

The accompanying drawings illustrate my invention.

Figure 1 is a longitudinal section of my newly-invented conduit-pipe. Fig. 2 is a cross-section of such pipe. Fig. 3 is an exaggerated cross-sectional fragment of the same. Fig. 4 shows the pipe in the process of manufacture.

My newly-invented conduit-pipe is composed of a convolute sheet of paper A, an interposed stiff convolute body B, having an asphaltum base, and an asphaltum filling C, saturating and permeating the convolute paper and united with the said interposed convolute body B. The asphaltum filling which saturates and permeates the paper must be of a comparatively thin and light character, such as maltha or, preferably, the grade of asphalt known to the trade in Southern California as "grade D." This grade of asphaltum is sufficiently fluid to flow slowly in the heat of the sun of a hot summer's day, but requires to be heated to a perfectly fluid state in order to saturate the paper. A boiling heat is ordinarily required for the proper saturation with asphaltum of this grade. The asphaltum of which the stiff convolute interposed body is made is much harder, being of the grades known to the trade in Southern California as grades "A" or "B." These grades of asphaltum are sufficiently stiff and hard to stand without becoming sticky in the heat of a summer's sun in Southern California, being a temperature of approximately 100°, more or less, so that at the ordinary temperatures to which the pipe will be exposed the interposed convolute body of asphaltum will be hard and stiff. The paper which I prefer to use is a heavy grade of paper—such, for example, as that which is known to the trade as "building-paper," being sufficiently porous to become perfectly saturated with the thin asphaltum above referred to when the same is heated to a boiling heat, as stated, and the paper is immersed therein for a considerable time. The manufacture of this pipe is practically carried on by first passing the paper slowly through a bath C' of the highly-heated thin asphaltum. After the paper is thus thoroughly saturated it is passed through a bath D' of the highly-heated stiff asphaltum, said asphaltum being brought to a fluid state by the high heat to which it is subjected. The paper, being thus saturated with the thin asphaltum and coated with the thick asphaltum D, is carried to a pair of rolls E F and is wound around one of the rolls, E, the other roll, F, being applied to force the layers of paper together to regulate the thickness of the interposed convolute body of stiff asphaltum. The paper is wound upon the rolls at a slow speed—say from three to six turns per minute, depending upon the temperature at the rolls—so as to allow the asphaltum of one layer to become nearly set before another layer of asphaltum and paper is wound upon such first layer, and so on, the winding being continued until the required number of thicknesses of paper and asphaltum have been applied. In the drawings I have shown a pipe formed with six layers of paper. The paper is preferably wound from six to fourteen or more turns, depending upon the strength of pipe required. With a winding of twelve turns I have produced a four-inch pipe which resisted an internal pressure of one hundred and eighty pounds to the square inch without any sign of starting or bursting. The ultimate strength of such pipe has never been tested by me and, so far as I am aware, is not known; but it is over one hundred and eighty pounds to the square inch. The pipe thus formed is very strong and rigid and will sustain a heavy crushing weight.

In the manufacturing of my newly-invented pipe I prefer to temper the stiff body of asphaltum with sulfur in the proportion of, say, five pounds of sulfur to one hundred pounds of asphaltum, the same being added to and thoroughly mixed with the stiff asphaltum while it is heated in the bath.

During the manufacture of the pipe a sufficient tension is applied to the paper to cause it to wind tightly. The thickness of the completed pipe of twelve layers is about three-eighths of an inch.

I do not limit myself to the use of any particular grades of asphaltum. The thin asphaltum is to be sufficiently fluid under the high heat to saturate the paper, and the stiff asphaltum should be hard at ordinary temperatures.

What I claim, and desire to secure by Letters Patent of the United States, is—

1. A conduit-pipe composed of a convolute sheet of paper; an interposed convolute body having an asphaltum base; and an asphaltum filling saturating and permeating the convolute paper and united with the said interposed convolute body substantially as set forth.

2. A conduit-pipe composed of a convolute sheet of paper saturated with a filling of asphaltum or maltha and an interposed convolute body substantially composed of stiff asphaltum.

3. A conduit-pipe composed of an integral convolute porous sheet saturated with a filling of asphaltum or maltha and an interposed convolute body contacting throughout with both sides of said sheet and substantially composed of stiff asphaltum.

4. A conduit-pipe composed of two convolutes intimately united, one of said convolutes consisting of a sheet of paper saturated with an asphaltum filling and the other convolute consisting of a body having an asphaltum base and contacting with both sides of said saturated sheet.

5. A conduit-pipe composed of a convolute sheet of paper saturated with a filling of asphaltum or maltha and an interposed convolute body contacting throughout with both sides of said saturated sheet and substantially composed of stiff asphaltum.

In testimony whereof I have signed my name to this specification, in the presence of two subscribing witnesses, at Los Angeles, California, this 22d day of March, 1901.

ALBERT S. DIXON.

Witnesses:
JAMES R. TOWNSEND,
JULIA TOWNSEND.